United States Patent
Calvert et al.

(10) Patent No.: US 11,696,024 B2
(45) Date of Patent: Jul. 4, 2023

(54) VIDEO ANALYTICS SCENE CLASSIFICATION AND AUTOMATIC CAMERA CONFIGURATION BASED AUTOMATIC SELECTION OF CAMERA PROFILE

(71) Applicant: JOHNSON CONTROLS TYCO IP HOLDINGS LLP, Milwaukee, WI (US)

(72) Inventors: William T. Calvert, Belfast (IE); Terence Neill, Lisburn (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 182 days.

(21) Appl. No.: 16/996,688

(22) Filed: Aug. 18, 2020

(65) Prior Publication Data
US 2022/0060624 A1    Feb. 24, 2022

(51) Int. Cl.
| | | |
|---|---|---|
| *H04N 23/62* | (2023.01) | |
| *H04N 23/617* | (2023.01) | |
| *H04N 23/667* | (2023.01) | |
| *H04N 7/18* | (2006.01) | |
| *H04N 1/32* | (2006.01) | |
| *G06F 18/24* | (2023.01) | |
| *H04N 101/00* | (2006.01) | |

(52) U.S. Cl.
CPC ........... *H04N 23/667* (2023.01); *G06F 18/24* (2023.01); *H04N 1/32106* (2013.01); *H04N 7/183* (2013.01); *H04N 23/617* (2023.01); *H04N 23/62* (2023.01); *H04N 2101/00* (2013.01); *H04N 2201/3226* (2013.01); *H04N 2201/3228* (2013.01); *H04N 2201/3276* (2013.01); *H04N 2201/3277* (2013.01)

(58) Field of Classification Search
CPC .......... H04N 5/23245; H04N 5/23218; H04N 5/23225; H04N 5/23216; H04N 1/32106; H04N 7/18; H04N 7/183; H04N 2101/00; H04N 2201/3226; H04N 2201/3228; H04N 2201/3276; H04N 2201/3277; H04N 23/667; H04N 23/617; H04N 23/62; H04N 23/61; G06K 9/6267; G06V 10/765; G06V 20/44; G06V 20/52; G06V 20/41; G06V 2201/10
See application file for complete search history.

(56) References Cited

U.S. PATENT DOCUMENTS

| | | | | |
|---|---|---|---|---|
| 2009/0268024 | A1* | 10/2009 | Tsukuda | H04N 21/485 348/143 |
| 2010/0260376 | A1* | 10/2010 | Cobb | G06V 20/54 382/156 |
| 2012/0062732 | A1* | 3/2012 | Marman | G08B 13/19682 348/142 |

* cited by examiner

*Primary Examiner* — Nelson D. Hernández Hernández
(74) *Attorney, Agent, or Firm* — ArentFox Schiff LLP (57) ABSTRACT

Example implementations include a method, apparatus and computer-readable medium for configuring profiles for a camera, comprising receiving video from the camera. The implementations further include classifying a first scene of the first video stream. Additionally, the implementations further include determining a first metadata for the first scene. Additionally, the implementations further include selecting a first profile for the camera based on the first metadata, wherein the first profile comprises one or more configuration parameters, wherein values of each of the one or more configuration parameters of the first profile are based on the first metadata. Additionally, the implementations further include configuring the camera with the first profile.

21 Claims, 5 Drawing Sheets

VIDEO ANALYTICS SCENE CLASSIFICATION AND AUTOMATIC CAMERA CONFIGURATION BASED AUTOMATIC SELECTION OF CAMERA PROFILE

TECHNICAL FIELD

The described aspects relate to method of configuring profiles for a camera and specifically to selection of a camera profile based on video analytics scene classification.

BACKGROUND

In the context video camera systems, manual configuration of profiles for a camera may be a cumbersome process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of configuring profiles for a camera. The method includes receiving, at a processor, video from the camera. The method further includes classifying, at the processor, a first scene of the first video stream. The method further includes determining, at the processor, a first metadata for the first scene. The method further includes selecting, at the processor, a first profile for the camera based on the first metadata, wherein the first profile comprises one or more configuration parameters, wherein values of each of the one or more configuration parameters of the first profile are based on the first metadata. The method further includes configuring, at the processor, the camera with the first profile.

Another example implementation includes an apparatus for configuring profiles for a camera, comprising of memory and a processor in communication with the memory. The processor is configured to receive video from the camera. The processor is further configured to classify a first scene of the first video stream. Additionally, the processor further configured to instruct display of the first information. Additionally, the processor is further configured to select a first profile for the camera based on the first metadata, wherein the first profile comprises one or more configuration parameters, wherein values of each of the one or more configuration parameters of the first profile are based on the first metadata. Additionally, the processor is further configured to configure the camera with the first profile.

Another example implementation includes a computer-readable medium computer-readable medium comprising stored instructions for configuring profiles for a camera, executable by a processor to receive video from the camera. The instructions are further executable to classify a first scene of the first video stream. Additionally, the instructions are further executable to determine a first metadata for the first scene, wherein the first information comprises a first set of local information associated with the area. Additionally, the instructions are further executable to select a first profile for the camera based on the first metadata, wherein the first profile comprises one or more configuration parameters, wherein values of each of the one or more configuration parameters of the first profile are based on the first metadata. Additionally, the instructions are further executable to configure the camera with the first profile.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The method, apparatus and computer readable medium of the present application may automatically configure a camera with a configuration profile based on scene classification using video analytics.

The method, apparatus and computer readable medium for configuring profiles of a camera utilize video analytics scene classification to automate the rules configuration process based on certain types of background objects. For example, if the video analytics, which may include artificial intelligence (AI) and/or machine learning (ML) based models for classifying objects, detect a particular type of object, e.g., a doorway, in the background scene, the system will auto-generate separate detected object-specific rules, e.g., enter and exit rules around the detected door area. The rules will produce an event if a person enters or exits the door.

The method, apparatus and computer readable medium can automate the process of video analytics rule creation, reducing the time and expense for customer installation and setup of security cameras. This can provide significant savings in time, cost and effort for large security systems that may contain hundreds of cameras. Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
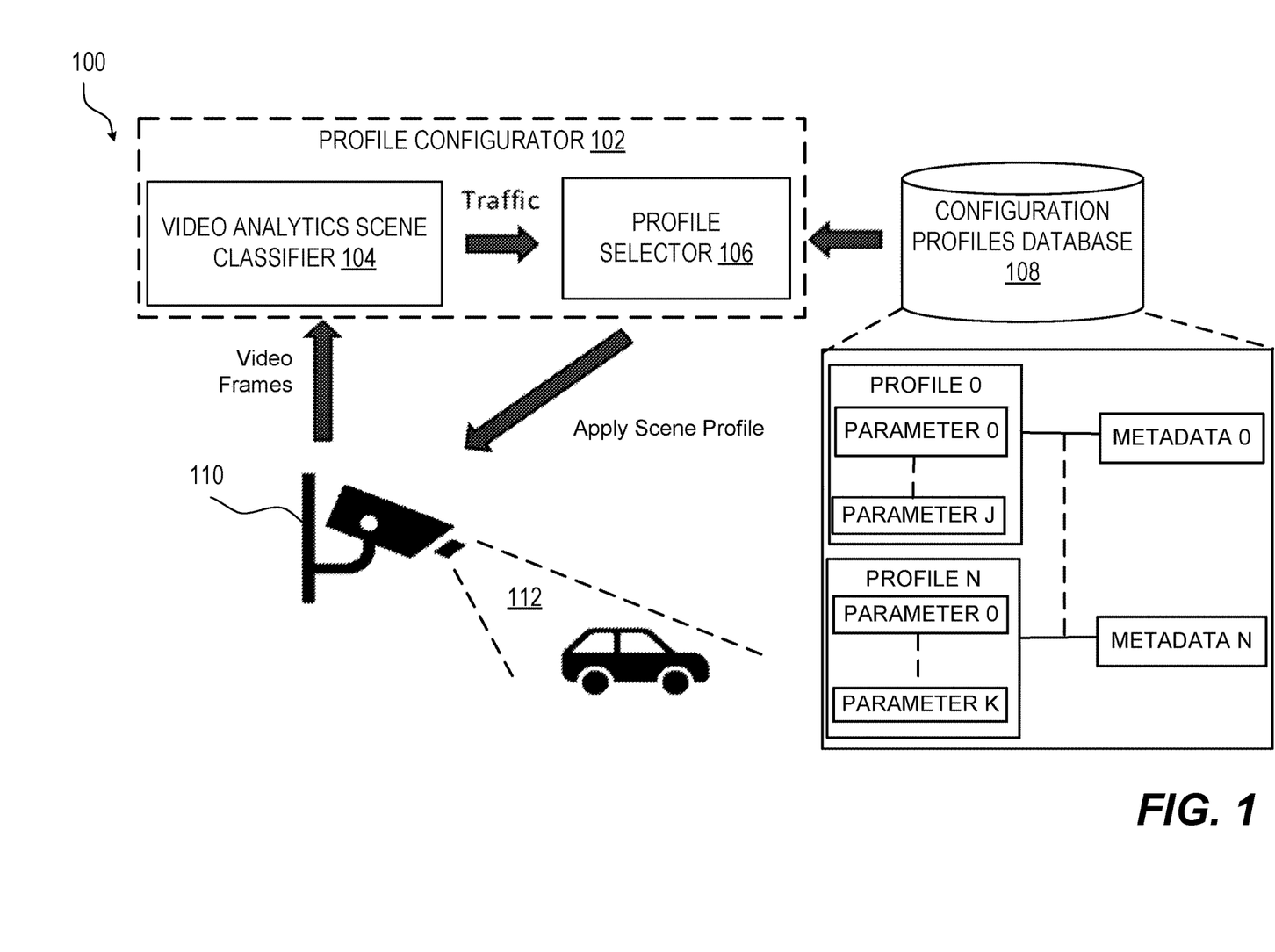
FIG. 1 is a schematic diagram of a system for configuring profiles of a camera based on video analytics scene classification.

Referring to FIG. 1, a system diagram 100 for configuring profiles of a camera based on video analytics scene classification includes a profile configurator 102. The profile configurator 102 includes a video analytics scene classifier 104 that receives video frames from a camera 110 monitoring a scene 112, which in one non-limiting example may include a parked car, classifies one or more scenes from the video frames (e.g., determines metadata for the scenes) and sends the classified scenes to a profile selector 106. The profile selector 106 selects a profile for a camera from a configuration profiles database 108 based on the scenes classification (i.e., the scenes metadata received from the video analytics scene classifier 104). In one implementation, the configuration profiles database 108 may store camera profiles based on metadata, where each profile is scene-specific and includes scene-specific parameters and/or parameter values. For example, the metadata may classify a scene as a parking garage, and the corresponding profile may be a car parking profile. In this example, the car parking profile may include one or more configuration parameters or rules for the camera such as exposure, frame rate, bit rate, wide dynamic range (WDR), color profile, resolution, group of pictures (GOP) structure, rotation speed, or rotation range.

The configuration profiles database 108 may store camera profiles associated with metadata as shown in FIG. 1. In one implementation, the configuration profiles database 108 may store a plurality of profiles and metadata, e.g., Profile 0 corresponding to Metadata 0 to Profile N, where 0 to N is any set of positive integers, corresponding to Metadata N. Profile 0 may include one more parameters, e.g., Parameter 0 to Parameter J, where 0 to J is any set of positive integers, similarly Profile N may include one more parameters Parameter 0 to Parameter K, where 0 to K is any set of positive integers. The Metadata 0 to Metadata N may correspond to the classification of a scene as described above. Parameter 0 to Parameter J and Parameter 0 to Parameter K may correspond to configuration parameters for the camera as described above. The profile selector 106 may select a profile from the profiles stored in the configuration profiles database 108 based on the scenes metadata received from the video analytics scene classifier 104. The profile selector 106 or one or more of the other components of the profile configurator 102 may configure the camera 110 with the selected profile.

Figure 2:
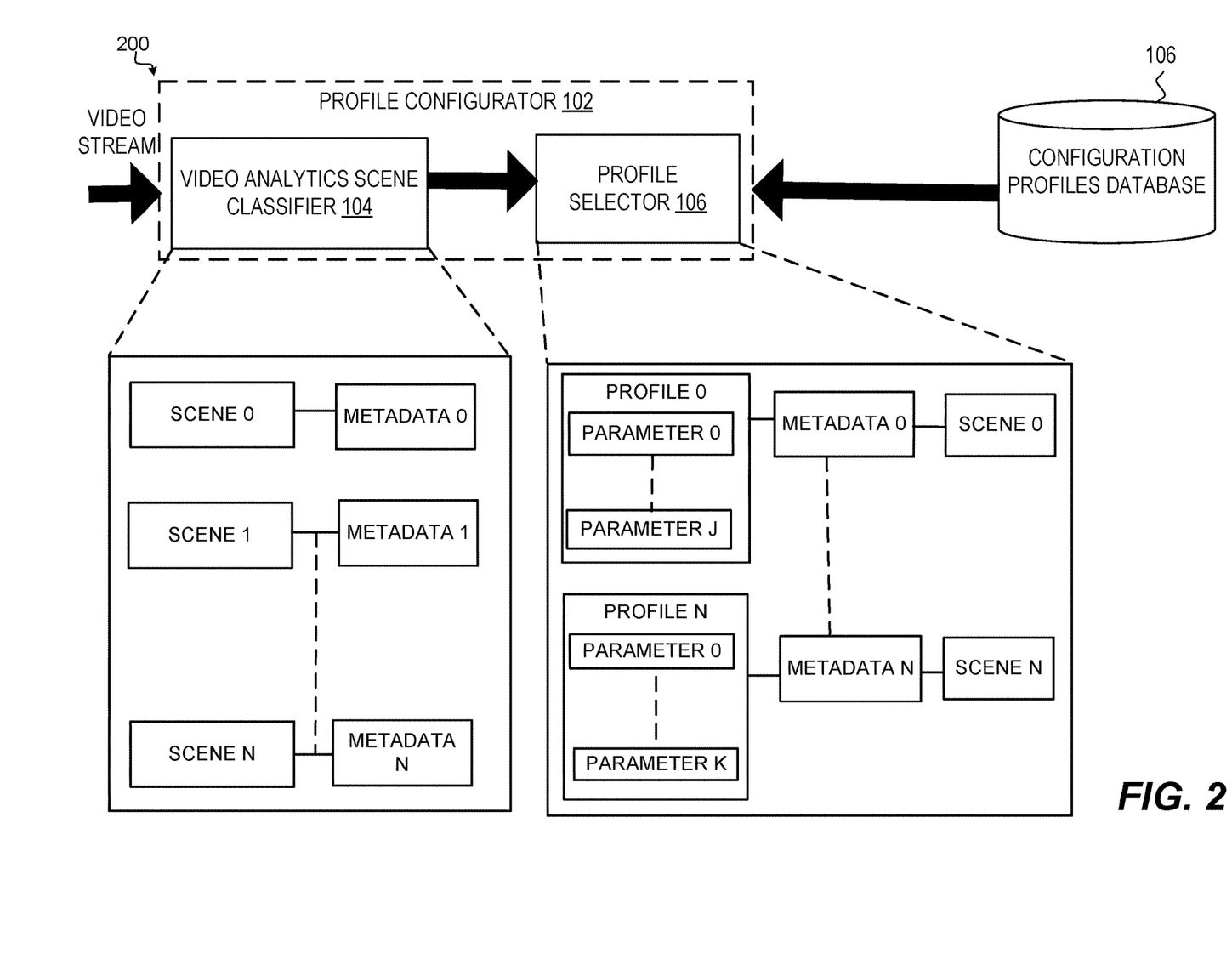
FIG. 2 is an information flow diagram for configuring profiles of a camera based on video analytics scene classification.

Referring to FIG. 2, an information flow diagram 200 illustrates configuring profiles of a camera in the system 100 (as described above with reference to FIG. 1. The video analytics scene classifier 104 receives a video stream (e.g., a sequence of video frames from the camera 110) and may classify the scenes in the video stream as Scene 0, Scene 1 to Scene N, where 0 to N is any set of positive integers. The video analytics scene classifier 104 may also determine the metadata (e.g., Metadata 0, Metadata 1 to Metadata N, where 0 to N is any set of positive integers) for each of the scenes (Scene 0, Scene 1 to Scene N). For example, the video analytics scene classifier 104 may utilize an AI or ML technique to classify the scenes and determine the metadata for the scenes. The video analytics scene classifier 104 sends the metadata (Metadata 0, Metadata 1 . . . Metadata N) associated with the respective scenes to the profile selector 106.

In one implementation, the video analytics scene classifier 104 may receive a first video stream from the camera 110, classify the first scene and determine a first metadata for the first scene of the first video stream. The video analytics scene classifier 104 may receive a second video stream from the camera 110 (e.g., at a predetermined time interval after receiving the first video stream). The video analytics scene classifier 104 may classify the second scene and determine a second metadata for the second scene. In one implementation, the video analytics scene classifier 104 may classify the second scene after a predetermined interval of classifying the first scene. The video analytics scene classifier 104 may send the first metadata and the second metadata to the profile selector 106. The profile selector 106 may determine a difference between one or more entries in a first set of entries of the first metadata and the corresponding one or more entries in a second set of entries of the second metadata. The profile selector 106 may verify that the difference between one or more entries in a first set of entries of the first metadata and the corresponding one or more entries in a second set of entries of the second metadata is greater than a threshold. For example, an entry in the first set of entries of the first metadata may represent a scene environment and may have a coded value corresponding to a scene location (e.g., an indoor scene, an outdoor scene, a traffic scene etc.). Similarly, a corresponding entry in the second set of entries of the second metadata may have a coded value corresponding to the scene location. In one implementation, the profile selector 106 may determine the difference between the coded value of the entry in the first set of entries of the first metadata and the coded value of the corresponding entry in the second set of entries of the second metadata. The profile selector 106 may verify that the difference is greater than the threshold and select a second profile for the second scene from the configuration profiles database 108. For example, the difference being greater than the threshold may indicate that the first scene has a different scene location than the second scene (e.g., the first scene being an indoor scene and the second scene being a traffic scene). On determining that the first scene has a different scene location than the second scene, the profile selector 106 may configure the second profile for the camera 110. In one implementation, the profile selector 106 may determine that the difference, between the coded value of the entry in the first set of entries of the first metadata and the coded value of the corresponding entry in the second set of entries of the second metadata, is smaller than or equal to the threshold. The difference being smaller than or equal to the threshold may indicate that the first scene and the second scene have as the same scene location (e.g., an indoor scene). The profile selector 106 may maintain the first profile for the camera 110 on determining that the difference is less than the threshold. It should be understood that differences between scenes may identify other parameters besides a change in location, such as a difference between a time of day (e.g., daytime versus night time) or any other scene difference that may be associated with a change in a camera configuration profile parameter for setting up the camera to operate well in the given set of conditions that define the scene.

The profile selector 106 may select the profiles for applying to the first scene and the second scene from the configuration profiles database 108. For example, the configuration profiles database 108 may store profiles such as an indoor office profile, a casino profile, a transit station profile, a car parking profile, a building entrance profile, a retail store profile, etc. with the profiles specifying one or more configuration parameters or rules for the camera 110 (as described above). In one example, the video analytics scene classifier 104 may classify a scene as a fence or wall in the background scene. The video analytics scene classifier 104 may send the metadata of the scene to the profile selector 106. Based on the metadata, the profile selector 106 may select a profile based on the metadata. For example, the profile selector 106 may select a profile that includes a perimeter rule (along the fence or boundary) among the parameters of the profile. The perimeter rule may specify generating an event when the camera 110 detects a person or an object crossing the perimeter. In another example, the video analytics scene classifier 104 may classify a scene as a retail checkout in the background scene. The video analytics scene classifier 104 may send the metadata of the scene to the profile selector 106. Based on the metadata, the profile selector 106 may select, a profile that includes a queue rule at a checkout among the parameters of the profile. The que rule at the checkout may specify monitoring a queue size and specify generating an event when the camera 110 detects that the queue reaches a specified length.

In one implementation, the profile selector 106 may select a default profile, when the configuration profiles database 108 does not include a profile corresponding to the metadata of the scene sent by the video analytics scene classifier 104. In another implementation, the profile selector 106 may prompt for a user input for a custom user profile when the configuration profiles database 108 does not include a profile corresponding to the metadata of the scene sent by the video analytics scene classifier 104. For example, the profile selector 106 may prompt the user to input one or more configuration parameters or rules (as described above) for the custom user profile in absence of a profile corresponding to the metadata of the scene in the configuration profiles database 108. Further, in another implementation, the profile selector 106 may allow a user to interrupt the selection of profiles from the configuration profiles database 108 and instead specify a custom user profile. For example, in response to receiving an interrupt from the user, the profile selector 106 may cease fetching a profile corresponding to the metadata of the scene (received from the video analytics scene classifier 104), and allow the user to specify one or more configuration parameters or rules for the custom user profile. In one implementation, the profile selector 106 may display the metadata of the scene to facilitate the user in specifying the configuration parameters or rules for the custom user profile.

Figure 3:
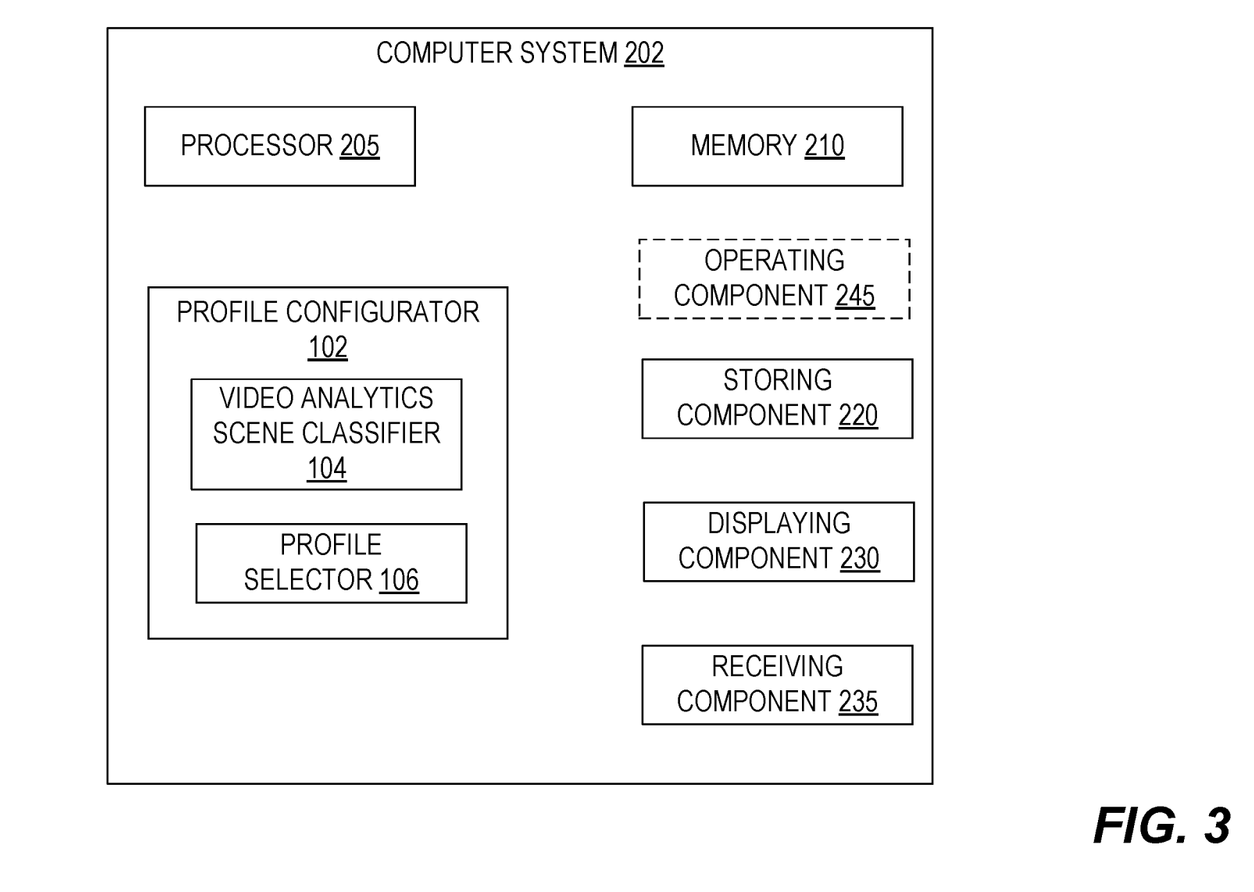
FIG. 3 is a block diagram of an example computer system operable to configure profiles of a camera based on video analytics scene classification.
Figure 4:
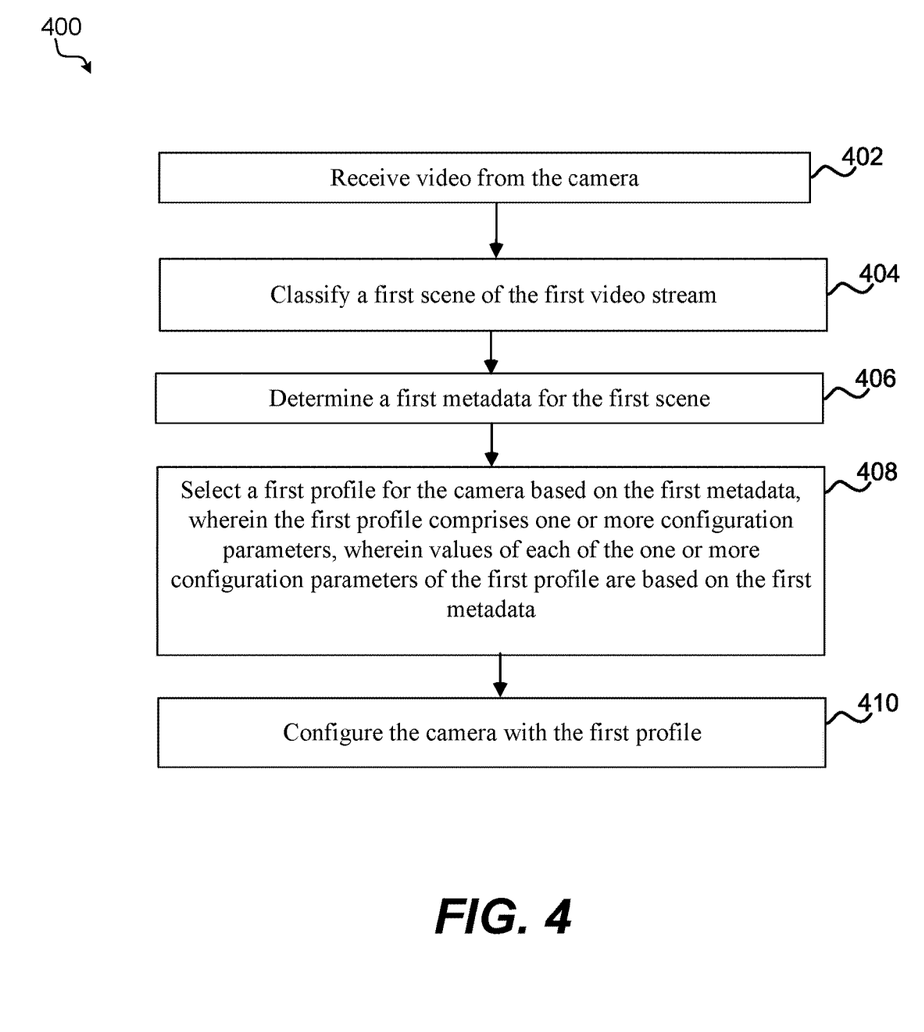
FIG. 4 is flow diagram of an example method of operation for configuring profiles of a camera based on video analytics scene classification.

Referring to FIGS. 3-4, in operation, a computer system 202 may perform an example method 400 for configuring profiles for the camera 110 (as described above with reference to FIGS. 1 and 2) such as via execution of the profile configurator 102 (including the video analytics scene classifier 104 and the profile selector 106) by a processor 205 and/or a memory 210. The computer system 202 may include an optional operating component 245 configured to perform one or more operations of the video analytics scene classifier 104 and/or the profile selector 106. The computer system 202 may include a storing component 220 that may temporarily or permanently store configuration profiles, a displaying component 230 that may display one or more prompts to a user for a custom user profile and a receiving component 235 to receive one or more inputs from a user for input of a custom user profile. The operation of the example method 400 in FIG. 4 is described in combination with the computer system architecture of FIG. 3 and the overall system architecture of FIG. 1.

Referring to FIG. 4, the example method 400 of operation for configuring profiles of a camera based on video analytics scene classification.

At block 402, the example method 400 includes receiving video from the camera. In one implementation, the processor 205 may receive the video from the camera 110. For example, the processor 205 may temporarily store a first video stream from the camera 110 at the memory 210.

At block 404, the example method 400 includes classifying a first scene of the first video stream. In one implementation, the processor may execute one or more instructions stored at the video analytics scene classifier 104, e.g., including a ML model and/or an AI model, and/or the memory 210 to classify the first scene. For example, the instructions may include classifying the first scene in the video stream as described above with reference to FIGS. 1 and 2.

At block 406, the example method 400 includes determining a first metadata for the first scene. In one implementation, the processor 205 may execute one or more instructions stored at the video analytics scene classifier 104 and/or the memory 210, e.g., including a ML model and/or an AI model, to determine the first metadata for the first scene. For example, the instructions may include determining one or more entries in the first metadata based on the classification of the first scene as described above with reference to FIGS. 1 and 2.

At block 408, the example method 400 includes selecting a first profile for the camera based on the first metadata, the first profile comprises one or more configuration parameters, the values of each of the one or more configuration parameters of the first profile are based on the first metadata. In one implementation, the processor 205 may execute one or more instructions stored in the profile selector 106 and/or the memory 210, e.g., including a ML model and/or an AI model and/or other rules or functions that match metadata to profiles, to select the first profile for the camera 110 from the profiles stored in the storing component 220 and/or the configuration profiles database 108. For example, the instructions may include selecting the first profile for the camera 110 based on the first metadata (determined at block 406) and the first profile may include one or more configuration parameters based on the first metadata as described above with reference to FIGS. 1 and 2.

At block 410, the example method 400 includes configuring the camera with the first profile. In one implementation, the processor 205 may execute one or more instructions stored in the profile selector 106 and/or the memory 210 to configure the camera 110 with the first profile. For example, the instructions may include applying one or more configuration parameters for operating the camera 110 as described above with reference to FIGS. 1 and 2. Accordingly, the camera 110 may be configured to operate using parameters specifically configured based on the detected scene 112.

Figure 5:
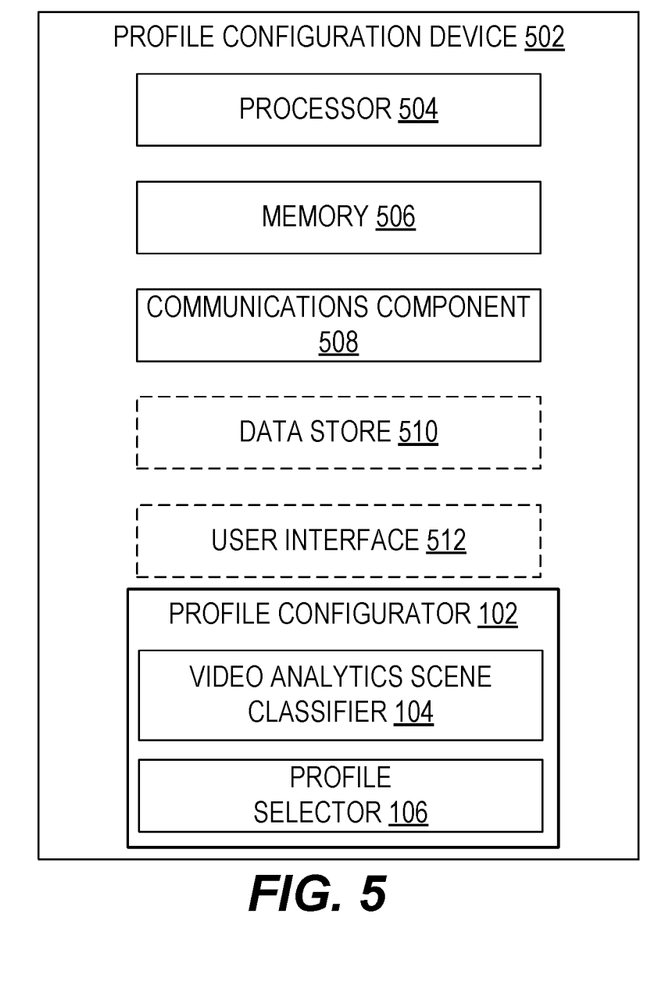
FIG. 5 is a system diagram of an example profile configuration device operable to configure profiles of a camera based on video analytics scene classification.

Referring to FIG. 5, an example profile configuration device 502 for configuring profiles for a camera includes a more detailed example of the profile configurator 102 (as described above with reference to FIGS. 1-4) including a number of components configured to perform the functions described herein. The profile configuration device 502 may include some or all of the components of the computer system 202 (as described above with reference to FIG. 3) such as the processor 205, one or more memories, such as the memory 210, configured to execute instructions stored in the profile configurator 102. The profile configuration device 502 may optionally include a data store 510 similar to the storing component 220 and/or the configuration profiles database 108, as described above with reference to FIGS. 3 and 1, respectively. The profile configuration device 502 may include a communications component 508 to enable communication of the profile configuration device 502 with one or more network devices or databases (e.g., the configuration profiles database 108 when the configuration profiles database 108 is stored outside the profile configuration device 502). The profile configuration device 502 may optionally include a user interface 512 to receive one or more inputs from the user (e.g., through a keyboard, a mouse, a touchscreen, etc.) and to display information to the user (e.g., a monitor, a touchscreen, etc.). The user interface 512 may include the functionalities of the displaying component 230 and the receiving component 235 as described above with reference to FIG. 3. Various software aspects are described in terms of this example profile configuration device 502. After reading this description, it will become apparent to a person skilled in the relevant art(s) how to implement aspects of the disclosure using other computer systems and/or architectures.

The memory 506 of the profile configuration device 502 may be a main memory, preferably random access memory (RAM). The profile configuration device 502 may include a secondary memory, for example, a hard disk drive, and/or a removable storage drive representing a floppy disk drive, a magnetic tape drive, an optical disk drive, a universal serial bus (USB) flash drive, etc. The removable storage drive may read from and/or writes to a removable storage unit in a well-known manner. Removable storage unit may represent a floppy disk, magnetic tape, optical disk, USB flash drive, a solid state drive (SSD), etc., which is read by and written to the removable storage drive. As will be appreciated, the removable storage unit may include a computer usable storage medium having stored therein computer software and/or data to perform one or more operations as described above with reference to FIGS. 1-4.

In this document, the terms "computer program medium" and "computer usable medium" are used to refer generally to non-transitory computer-readable media stored on a non-transitory memory device, which may include devices such as a removable storage unit and a hard disk installed in a hard disk drive in the profile configuration device 502. These computer program products provide software to the profile configuration device 502. Aspects of the present disclosure are directed to such computer program products. Computer programs (also referred to as computer control logic) are stored in memory 506 and/or secondary memory. Such computer programs, when executed, enable the profile configuration device 502 to perform the features in accordance with aspects of the present disclosure, as discussed herein. In particular, the computer programs, when executed, enable the processor 504 to perform the features in accordance with aspects of the present disclosure. Accordingly, such computer programs represent controllers of the profile configuration device 502.

In an aspect of the present disclosure where the disclosure is implemented using software, the software may be stored in a computer program product and loaded into profile configuration device 502 using removable storage drive, hard drive, or the communications component 508. The control logic (software), when executed by the processor 504, causes the processor 504 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

The various embodiments or components described above, for example, the camera 110, the profile configurator 102, video analytics scene classifier 104, the profile selector 106, the configuration profiles database 108, the computer system 202, the profile configuration device 502, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of configuring profiles for a camera, comprising:
    receiving, at a processor, video from the camera;
    classifying, at the processor, a first scene of a first video stream;
    determining, at the processor, a first metadata for the first scene;
    selecting, at the processor, a first profile for the camera based on the first metadata, wherein the first profile comprises one or more configuration parameters for configuring the camera, wherein values of each of the one or more configuration parameters of the first profile are based on the first metadata; and
    configuring, at the processor, the camera with the first profile.

2. The method of claim 1, wherein receiving video from the camera comprises:
    receiving a first video stream including a first scene; and
    receiving a second video stream including a second scene.

3. The method of claim 2, further comprising:
    classifying, at the processor, the second scene of the second video stream;
    determining, at the processor, a second metadata for the second scene;

verifying, at the processor, that a difference between one or more entries in a first set of entries of the first metadata and the corresponding one or more entries in a second set of entries of the second metadata is greater than a threshold;

selecting, at the processor, a second profile for the camera based on verifying that the difference is greater than the threshold; and one of:

configuring, at the processor, the second profile for the camera based on the second metadata when the difference is greater than the threshold; or maintaining, at the processor, the first profile for the camera when the difference is less than or equal to the threshold.

4. The method of claim 3, wherein classifying the second scene of the video comprises:

classifying the second scene after a predetermined interval of classifying the first scene.

5. The method of claim 1, wherein the parameters comprise one or more of at least:

exposure;
frame rate;
bit rate;
wide dynamic range (WDR);
color profile;
resolution;
group of pictures (GOP) structure;
rotation speed; and
rotation range.

6. The method of claim 1, wherein selecting the first profile comprises:

selecting the first profile from a plurality of profiles stored in a configuration profiles database.

7. The method of claim 6, wherein the plurality of profiles comprises at least:

an indoor office profile;
a casino profile;
a transit station profile;
a car parking profile;
a building entrance profile; and
a retail store profile.

8. The method of claim 6, further comprising:

selecting, at the processor, a default profile as the first profile, when the configuration profiles database does not include a profile corresponding to the first metadata.

9. The method of claim 6, further comprising:

receiving, at the at the processor, an input from a user for a custom user profile, when the configuration profiles database does not include a profile corresponding to the first metadata.

10. The method of claim 1, further comprising:

configuring, at the processor, a custom user profile instead of the first profile in response to receiving a user interrupt.

11. An apparatus for configuring profiles for a camera, comprising:

a memory; and a processor in communication with the camera and the memory and the processor configured to:

receive video from the camera;
classify a first scene of a first video stream;
determine a first metadata for the first scene;
select a first profile for the camera based on the first metadata, wherein the first profile comprises one or more configuration parameters for configuring the camera, wherein values of each of the one or more configuration parameters of the first profile are based on the first metadata; and configure the camera with the first profile.

12. The apparatus of claim 11, wherein the processor configured to receive the video from the camera further comprises the processor configured to:

receive a first video stream including a first scene; and
receive a second video stream including a second scene.

13. The apparatus of claim 12, further comprising the processor configured to:

classify the second scene of the second video stream;
determine a second metadata for the second scene;
verify that a difference between one or more entries in a first set of entries of the first metadata and the corresponding one or more entries in a second set of entries of the second metadata is greater than a threshold;
select a second profile for the camera based on verifying that the difference is greater than the threshold; and one of:

configure the second profile for the camera based on the second metadata when the difference is greater than the threshold; or maintain the first profile for the camera when the difference is less than or equal to the threshold.

14. The apparatus of claim 12, wherein the processor configured to classify the second scene of the video comprises the processor configured to:

classify the second scene after a predetermined interval of classifying the first scene.

15. The apparatus of claim 11, wherein the parameters comprise one or more of at least:

exposure;
frame rate;
bit rate;
wide dynamic range (WDR);
color profile;
resolution;
group of pictures (GOP) structure;
rotation speed; and
rotation range.

16. The apparatus of claim 11, wherein the processor configured to select the first profile comprises the processor configured to:

select the first profile from a plurality of profiles stored in a configuration profiles database.

17. The apparatus of claim 16, wherein the plurality of profiles comprises at least:

an indoor office profile;
a casino profile;
a transit station profile;
a car parking profile;
a building entrance profile; and
a retail store profile.

18. The apparatus of claim 16, further comprising the processor configured to:

select a default profile as the first profile, when the configuration profiles database does not include a profile corresponding to the first metadata.

19. The apparatus of claim 16, further comprising the processor configured to:

receive an input from a user for a custom user profile, when the configuration profiles database does not include a profile corresponding to the first metadata.

20. The apparatus of claim 16, further comprising the processor configured to:

configure a custom user profile instead of the first profile in response to receiving a user interrupt.

21. A computer-readable medium storing instructions for configuring profiles for a camera, executable by a processor to:
  receive video from the camera;
  classify a first scene of a first video stream;
  determine a first metadata for the first scene;
  select a first profile for the camera based on the first metadata, wherein the first profile comprises one or more configuration parameters for configuring the camera, wherein values of each of the one or more configuration parameters of the first profile are based on the first metadata; and
  configure the camera with the first profile.

* * * * *